United States Patent
Nakano et al.

(10) Patent No.: US 10,835,858 B2
(45) Date of Patent: Nov. 17, 2020

(54) ACIDIC GAS ABSORBENT, ACIDIC GAS REMOVAL METHOD AND ACIDIC GAS REMOVAL APPARATUS

(71) Applicants: KABUSHIKI KAISHA TOSHIBA, Minato-ku (JP); TOSHIBA ENERGY SYSTEMS & SOLUTIONS CORPORATION, Kawasaki (JP)

(72) Inventors: Yoshihiko Nakano, Yokohama (JP); Akiko Suzuki, Ota (JP); Takashi Kuboki, Ota (JP); Toshihiro Imada, Kawasaki (JP); Shinji Murai, Sagamihara (JP); Reiko Yoshimura, Kawasaki (JP); Kenji Sano, Nerima (JP); Mitsuru Udatsu, Kawasaki (JP)

(73) Assignees: KABUSHIKI KAISHA TOSHIBA, Minato-ku (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 16/297,141

(22) Filed: Mar. 8, 2019

(65) Prior Publication Data
US 2020/0086265 A1    Mar. 19, 2020

(30) Foreign Application Priority Data
Sep. 18, 2018 (JP) ................... 2018-173931

(51) Int. Cl.
*B01D 53/14* (2006.01)
*B01J 20/22* (2006.01)

(52) U.S. Cl.
CPC .......... *B01D 53/1456* (2013.01); *B01J 20/22* (2013.01); *B01D 2252/2041* (2013.01); *B01D 2252/2056* (2013.01); *B01D 2252/20405* (2013.01); *B01D 2252/20447* (2013.01)

(58) Field of Classification Search
None
See application file for complete search history.

(56) References Cited

U.S. PATENT DOCUMENTS

| | | | |
|---|---|---|---|
| 4,100,257 | A | 7/1978 | Sartori et al. |
| 8,506,913 | B2 | 8/2013 | Murai et al. |
| 8,545,783 | B2 | 10/2013 | Murai et al. |

(Continued)

FOREIGN PATENT DOCUMENTS

| | | |
|---|---|---|
| JP | 53-100180 A | 9/1978 |
| JP | 2013-538125 A | 10/2013 |

(Continued)

OTHER PUBLICATIONS

"Safety Data Sheet for 2-(1,1-Dioxido-4-thiomorpholinyl)ethanamine." Sigma-Aldrich, published Aug. 29, 2014. Viewed on Feb. 5, 2020 at https://www.sigmaaldrich.com/catalog/product/aldrich/cds000122?lang=en&region=US.*

*Primary Examiner* — Daniel Berns
(74) *Attorney, Agent, or Firm* — Oblon, McClelland, Maier & Neustadt, L.L.P.

(57) ABSTRACT

The embodiments provide an acidic gas absorbent, an acidic gas removal method, and an acidic gas removal apparatus. The absorbent absorbs an acidic gas in a large amount and hardly diffuses in air. The acidic gas absorbent according to the embodiment comprises an amine compound having a sulfonyl group and two or more amino groups.

11 Claims, 1 Drawing Sheet

(56) References Cited

U.S. PATENT DOCUMENTS

| | | | |
|---|---|---|---|
| 9,409,119 B2 | 8/2016 | Murai et al. | |
| 9,446,346 B2 | 9/2016 | Murai et al. | |
| 9,724,642 B2 | 8/2017 | Murai et al. | |
| 10,046,269 B2 | 8/2018 | Murai et al. | |
| 2005/0282803 A1* | 12/2005 | Haley | C07D 233/22 514/227.5 |
| 2012/0248372 A1 | 10/2012 | Bara | |
| 2013/0164200 A1 | 6/2013 | Lail et al. | |
| 2013/0343974 A1 | 12/2013 | Murai et al. | |
| 2015/0044114 A1 | 2/2015 | Murai et al. | |
| 2015/0328581 A1 | 11/2015 | Lail et al. | |
| 2017/0266607 A1 | 9/2017 | Watando et al. | |
| 2018/0272267 A1 | 9/2018 | Kondo et al. | |
| 2019/0083921 A1 | 3/2019 | Suzuki et al. | |
| 2019/0083922 A1 | 3/2019 | Suzuki et al. | |
| 2019/0160422 A1 | 5/2019 | Murai et al. | |

FOREIGN PATENT DOCUMENTS

| | | |
|---|---|---|
| JP | 2014-97498 A | 5/2014 |
| JP | 2014-511759 A | 5/2014 |
| JP | 5659084 B2 | 1/2015 |
| JP | 5659127 B2 | 1/2015 |
| JP | 5659128 B2 | 1/2015 |
| JP | 2015-29987 A | 2/2015 |
| JP | 2015-71136 A | 4/2015 |
| JP | 2015-513464 A | 5/2015 |
| JP | 5713997 B2 | 5/2015 |
| JP | 2015-107443 A | 6/2015 |
| JP | 2015-112574 A | 6/2015 |
| JP | 5868795 B2 | 2/2016 |
| JP | 2016-93793 A | 5/2016 |
| JP | 2016-198714 A | 12/2016 |
| JP | 2017-35669 A | 2/2017 |
| JP | 2017-121610 A | 7/2017 |
| JP | 6173817 B2 | 8/2017 |
| JP | 2017-164696 A | 9/2017 |
| JP | 2017-164697 A | 9/2017 |
| JP | 2017-196547 A | 11/2017 |
| JP | 2018-122278 A | 8/2018 |
| JP | 2018-158302 A | 10/2018 |
| JP | 2018-183729 A | 11/2018 |
| JP | 2019-55371 A | 4/2019 |
| JP | 2019-55394 A | 4/2019 |
| JP | 2019-98284 A | 6/2019 |
| JP | 2019-98316 A | 6/2019 |

* cited by examiner

ACIDIC GAS ABSORBENT, ACIDIC GAS REMOVAL METHOD AND ACIDIC GAS REMOVAL APPARATUS

CROSS-REFERENCE TO RELATED APPLICATIONS

This application is based upon and claims the benefit of priority from the prior Japanese Patent Application No. 2018-173931, filed on Sep. 18, 2018, the entire contents of which are incorporated herein by reference.

FIELD

Embodiments of the present disclosure relate to an acidic gas absorbent, an acidic gas removal method and an acidic gas removal apparatus.

BACKGROUND

It has been recently pointed out that global warming is partly attributed to greenhouse effect caused by increase of carbon dioxide ($CO_2$) concentration, and it is urgent to take international measures to protect global environment. Carbon dioxide ($CO_2$) is largely generated by industrial activities, and there is an increasing momentum toward reduction of $CO_2$ emitted into the atmosphere. In particular, it is urgently necessary to reduce $CO_2$ emission from coal-fired power plants and factories. Further, it is also desired to reduce emission of acidic gases other than $CO_2$, such as hydrogen sulfide ($H_2S$).

In view of that, as means for reducing emission of acidic gases such as $CO_2$, much attention is paid to not only streamlining of thermal power plants or the like for emission reduction but also $CO_2$ recovery by use of chemical absorbents. As practical chemical absorbents, amine compounds have been studied for a long time. However, it is known that, when adopted for $CO_2$ absorption and desorption process, the absorbents are often heated to regenerate and thereby amine compounds contained therein may be diffused into the atmosphere. If amine compounds are diffused into the atmosphere in great amounts, there is a fear of unfavorable influences on surrounding environments of the processing plant. Accordingly, the plant is generally provided with amine traps made of water or acids so as to prevent diffusion of amine compounds.

It is thus necessary to install amine traps, but even so the amine traps are not always able to fully prevent diffusion of the absorbents.

DETAILED DESCRIPTION

Figure 1:
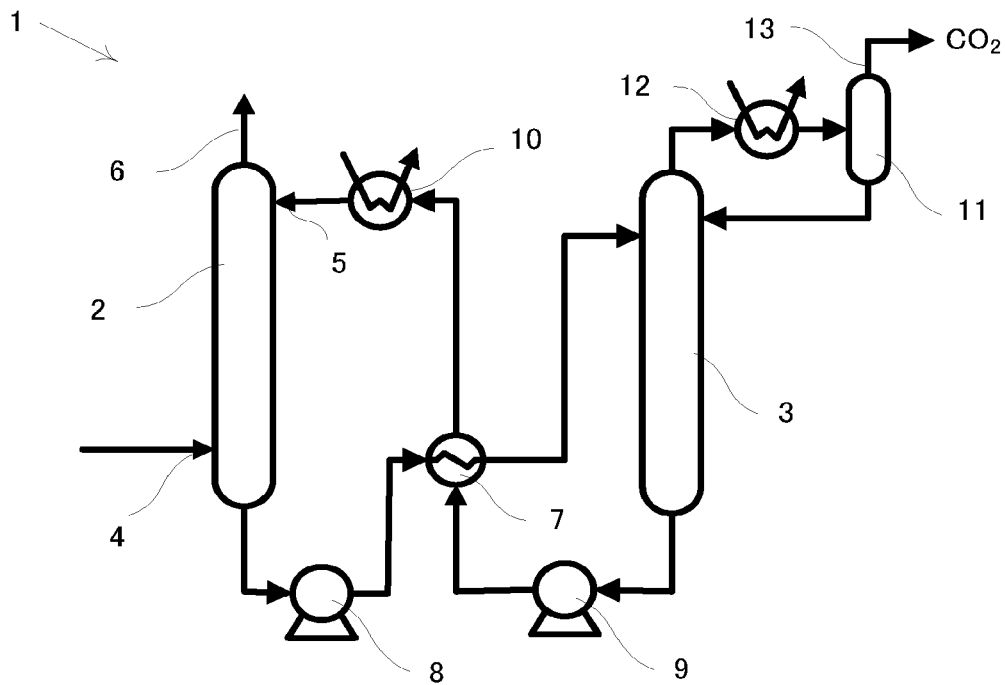
FIG. 1 schematically shows an acidic gas removal apparatus according to the embodiment.

Embodiments will now be explained with reference to the accompanying drawings.

The acidic gas absorbent according to an embodiment of the present disclosure comprises: an aliphatic amine compound having a sulfonyl group and two or more amino groups.

Further, in the acidic gas removal method according to another embodiment of the present disclosure, a gas containing an acidic gas is brought into contact with the above acidic gas absorbent so as to remove the acidic gas from the acidic gas-containing gas.

Furthermore, the acidic gas removal apparatus according to still another embodiment of the present disclosure comprises:

an absorption unit in which a gas containing an acidic gas is brought into contact with the above acidic gas absorbent, so that the absorbent absorbs the acidic gas to remove it from the acidic gas-containing gas; and a regeneration unit in which the absorbent holding the acidic gas is made to desorb the acidic gas so as to be regenerated;

so that the absorbent regenerated in the regeneration unit is reused in the absorption unit.

The embodiments are described below in detail.

In the following description, the embodiments will be explained mainly in case examples where the acidic gas is carbon dioxide ($CO_2$). However, the acidic gas absorbent according to the embodiment can give the same effect on other acidic gases such as hydrogen sulfide. Specifically, the absorbent of the embodiment is suitable to absorb oxidizing gases such as carbon dioxide and hydrogen sulfide. More specifically, the absorbent is particularly suitable for absorbing carbon dioxide and is advantageously employed in a system for recovering carbon dioxide from industrial exhaust fumes.

The acidic gas absorbent according to the embodiment contains an aliphatic amine compound having a sulfonyl group and two or more amino groups. The amino groups may be any of primary, secondary or tertiary ones, but many of them are preferably lower amino groups in view of acidic gas absorbability. The compound typically has one or more primary or secondary amino groups. Nitrogen atoms constituting the amino groups are preferably not combined with each other.

The term "sulfonyl" means a structure represented by —(O=S=O)—. However, in the present embodiment, the "sulfonyl group" particularly means only the structure connecting to a carbon atom. Accordingly, the "sulfonyl group" in the embodiment does not include —(O=S=O)— in —(O=S=O)—H, —(O=S=O)—O—, —(O=S=O)—NH— and the like. Further, the amine compound in the embodiment preferably does not contain those structures of —(O=S=O)—H, —(O=S=O)—O—, —(O=S=O)—NH— and the like. That is because those structures often impair the compound in stability and reactivity with acidic gases. The aliphatic amine compound may have two or more sulfonyl groups, but even in that case the sulfonyl groups are not combined with each other.

The sulfonyl group has a function of enhancing water-solubility of the amine compound, and is more stable than hydroxy, which can also enhance water-solubility. Accordingly, it is characteristic of the absorbent to lose a less amount of the compound when the absorbent is recovered to reuse. In addition, the compound having a sulfonyl group has a high vapor pressure and hence hardly diffuses in air.

The term "aliphatic amine" generally means an amine compound having an aliphatic group, but in the present embodiment it means an amine compound having a substituted or unsubstituted hydrocarbon group other than aromatic groups. Accordingly, the compound may have, as well as a sulfonyl group, a substituent such as another amino, carbonyl or hydroxy group. In the embodiment, the compound has a structure in which amino and sulfonyl groups are connected with an aliphatic group.

The amine compound may have hydroxy groups unless they impair the effect of the embodiment because hydroxy groups have an effect of improving solubility of the compound. However, they often lower stability of the compound and hence the amine compound preferably contains no hydroxy groups. Further, the amine compound also preferably contains no acid groups such as carboxy (—C(=O)OH) and sulfo (—SO$_3$H) because they decrease pH value of the compound to disturb absorption of acidic gas.

The amine compound employed in the embodiment has the characteristics described above, and is preferably represented by the following formula (1a) or (1b):

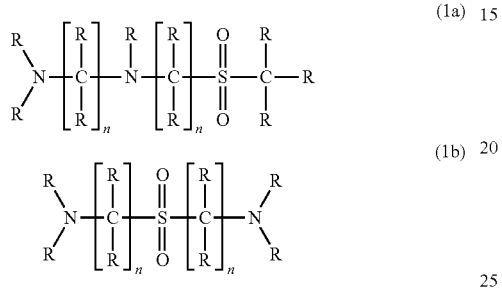

In the formulas, each R is independently hydrogen, an unsubstituted alkyl group, sulfonyl, amino, carbonyl or a hydroxy-substituted alkyl group. The substituted or unsubstituted alkyl group may have either a straight-chain skeleton or a branched-chain skeleton. In order to ensure sufficient solubility of the amine compound, the substituted or unsubstituted alkyl group preferably does not contain too many carbon atoms. Specifically, it preferably contains 1 to 4 carbon atoms. All of Rs are preferably hydrogens. Further, nitrogen atoms in the formula (1a) or (1b) react with and thereby adsorb an acidic gas, and hence at least one of Rs connecting to the nitrogen atoms is preferably hydrogen for the purpose of ensuring high reactivity and low steric hindrance.

Two of Rs may be linked to form a cyclic structure. For example, two Rs are connected via an alkylene group to form a cyclic diamine structure such as piperazine.

In the formulas, each n is independently an integer of 1 to 4, preferably 1 to 3.

Examples of the compound represented by the formula (1a) or (1b) include:

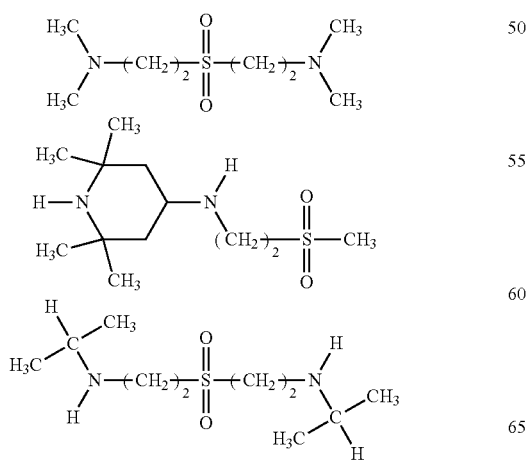

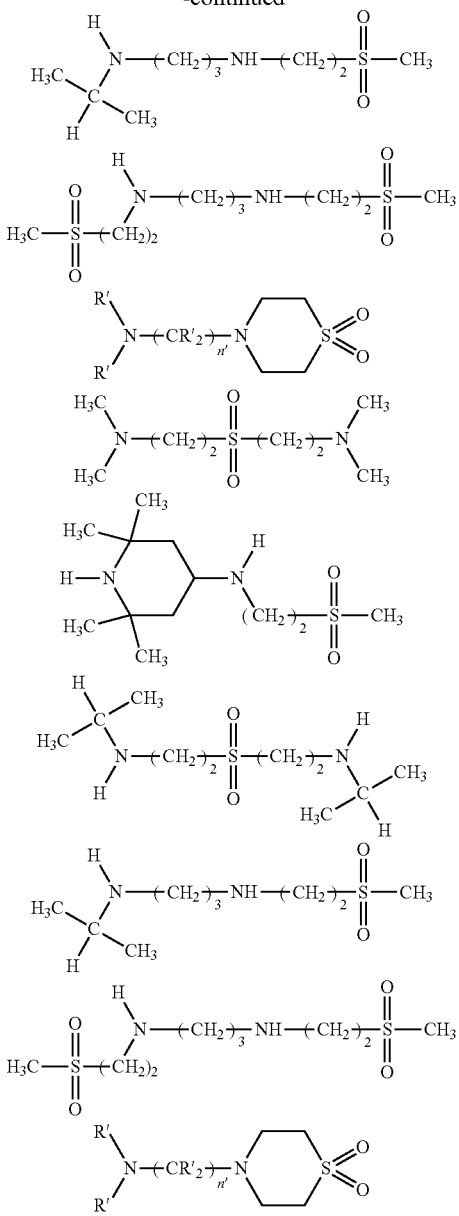

(in which
each R' is independently hydrogen, an unsubstituted alkyl group, sulfonyl, amino, carbonyl or a hydroxy-substituted alkyl group; and
n' is an integer of 2 to 4).

Further, examples of the compound represented by the formula (1a) or (1b) also include:

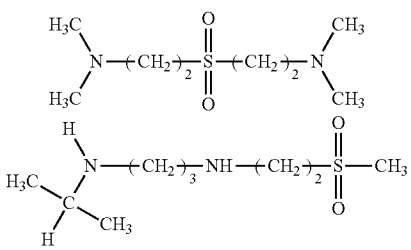

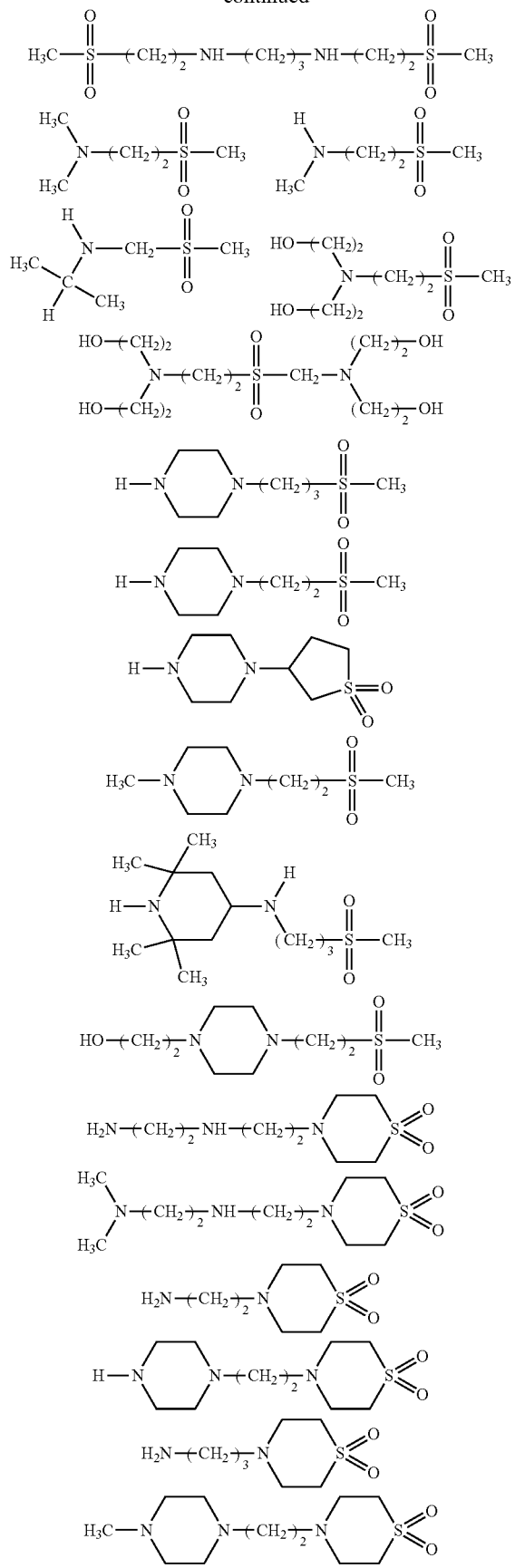

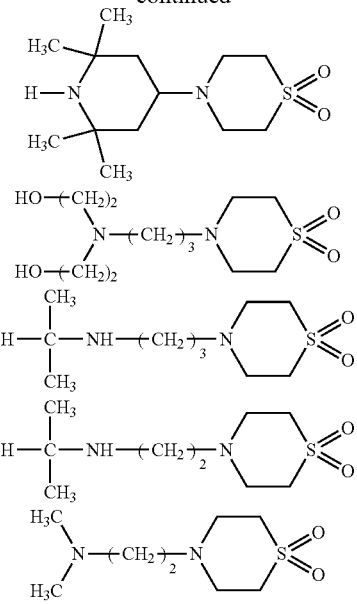

Particularly preferred examples of the amine compound represented by the formula (1a) or (1b) include:
1-(2-methylsulfonyl-ethyl)piperazine,
1-(2-methylsulfonyl-methyl)piperazine,
2,2-isopropylamino-diethylsulfone,

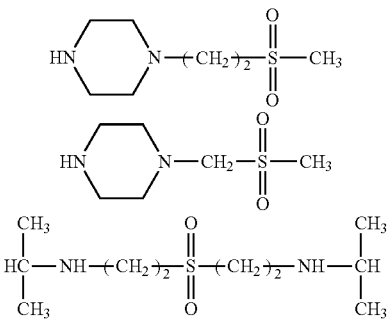

The amine compound adopted in the present embodiment can react with an acidic gas to absorb it, and then also can desorb the absorbed acidic gas, if necessary. The amine compound preferably has a high pKa value for the propose of reacting with an acidic gas. Specifically, the pKa value of the compound is preferably larger than 7, more preferably larger than 8.

The above compounds can be easily produced from starting materials, such as, amine compounds and sulfonyl compounds. The compounds thus obtained by reactions of them may be purified and then used for the absorbents. However, even if containing the starting materials such as amines as impurities, they are not degraded in acidic gas absorbability.

Those compounds can be used singly or in combination of two or more. The acidic gas absorbent contains the particular amine compound in an amount of preferably 3 to 60 wt %, more preferably 5 to 50 wt %.

It is generally preferred for the amine concentration to be high in view of energy consumption, plant scale and processing efficiency. That is because carbon dioxide is absorbed and desorbed in large amounts per unit volume and further the rates thereof are high when the amine compound is contained in a high concentration.

If the amine concentration is too high, the absorbent may generally have increased viscosity. However, the absorbent comprising the particular compound tends to have relatively low viscosity. Specifically, the viscosity is enough small when the absorbent contains the particular amine compound in an amount of 60 wt % or less. On the other hand, if the particular amine compound is contained in an amount of 10 wt % or more, carbon dioxide can be absorbed in a sufficient amount at a favorable rate to realize excellent processing efficiency.

When adopted for recovering $CO_2$, the acidic gas absorbent containing the aliphatic amine compound in an amount within the above range is not only capable of absorbing $CO_2$ in a large amount at a high rate but also capable of desorbing $CO_2$ in a large amount at a high rate. Accordingly, the absorbent has the advantage of efficiently recovering carbon dioxide. In addition, the absorbent is also favorable because of having such low diffusibility that the compound is emitted into the environment in only a small amount.

In the present embodiment, for example, an aqueous solution of the particular amine compound can be adopted as the acidic gas absorbent, which is particularly preferred in view of $CO_2$ absorption capacity and rate per unit mol and per unit volume of the absorbent. Further, energy for separating the acidic gas after $CO_2$ absorption (namely, desorption energy) can be so lowered as to reduce energy for regenerating the absorbent.

<Optional Ingredients>

The acidic gas absorbent according to the embodiment contains the particular amine compound, and it can further contain other optional ingredients according to necessity.

Examples of the optional ingredients include aminoalcohols, which can improve, for example, absorption capacity, desorption amount, absorption rate and the like of the acidic gas absorbent.

Preferred examples of the aminoalcohols include: monoethanolamine, 2-amino-2-methyl-1-propanol, 2-amino-2-methyl-1,3-dipropanol, diethanolamine, bis(2-hydroxy-1-methyethyl)amine, methyldiethanolamine, dimethylethanolamine, diethylethanolamine, triethanolamine, dimethylamino-1-methylethanol, 2-methylaminoethanol, 2-ethylaminoethanol, 2-propylaminoethanol, n-butylaminoethanol, 2-(isopropylamino)ethanol, 3-ethylaminopropanol, triethanolamine, and diethanolamine. Those compounds can be used singly or in combination of two or more.

Among those compounds, it is preferred to select at least one alkanolamine from the group consisting of 2-(isopropylamino)ethanol and 2-amino-2-methyl-1-propanol in view of improving the reactivity between the acidic gas and the aliphatic amine compound.

When those aminoalcohols are incorporated, the amount thereof is preferably 1 to 30 vol % based on 100 vol % of the aliphatic amine compound.

Further, the absorbent can also contain cyclic amine compounds.

Examples of the cyclic amine compounds include: azetidine, 1-methylazetidine, 1-ethylazetidine, 2-methylazetidine, 2-azetidylmethanol, 2-(2-aminoethyl)azetidine, pyrrolidine, 1-methylpyrrolidine, 2-methylpyrrolidine, 2-butylpyrrolidine, piperidine, 1-methylpiperidine, 2-ethylpiperidine, 3-propylpiperidine, 4-ethylpiperidine, hexahydro-1H-azepine, piperazine and piperazine derivatives.

The absorbent according to the embodiment may contain a solvent such as water. When water is used as the solvent, the amount thereof is preferably 20 to 60 wt %, more preferably 30 to 60 wt % (provided that the whole amount of the absorbent is regarded as 100 wt %). The amount of water is preferably within the above range in view of preventing viscosity increase of the absorbent and of inhibiting foaming when the absorbent absorbs carbon dioxide.

Further, examples of the optional ingredients also include oxidation inhibitors, pH adjusters, defoaming agents, and anticorrosive agents.

Preferred examples of the oxidation inhibitors include: dibutylhydroxytoluene (BHT), butylhydroxyanisole (BHA), sodium erythorbate, sodium nitrite, sulfur dioxide, 2-mercaptoimidazole and 2-mercaptobenzimidazole. When the oxidation inhibitor is incorporated, the amount thereof is preferably 0.01 to 1 wt %, more preferably 0.1 to 0.5 wt % (provided that the whole amount of the absorbent is regarded as 100 wt %). The oxidation inhibitor can inhibit deterioration of the absorbent to extend the working lifetime thereof.

Preferred examples of the defoaming agents include: silicone defoaming agents and organic defoaming agents. When the defoaming agent is incorporated, the amount thereof is preferably 0.00001 to 0.001 wt %, more preferably 0.0005 to 0.001 wt % (provided that the whole amount of the absorbent is regarded as 100 wt %). The defoaming agent can inhibit foaming of the absorbent so as to prevent decrease of absorption and desorption efficiencies and to keep the absorbent from degradation in fluidity and in circulation efficiency.

Preferred examples of the anticorrosive agents include: phosphate esters, tolyltriazoles, and benzotriazoles. When the anticorrosive agent is incorporated, the amount thereof is preferably 0.00003 to 0.0008 wt %, more preferably 0.00005 to 0.005 wt % (provided that the whole amount of the absorbent is regarded as 100 wt %). The anticorrosive agent prevents corrosion of the plant facilities to extend the working lifetime thereof.

As described above, the acidic gas absorbent of the present embodiment can increase the amount of absorbed acidic gas such as carbon dioxide and also can reduce diffusion of the reaction promoter. In addition, it is only a small amount of energy that is necessary for recovering the acidic gas. Further, since the absorbent contains an specific aliphatic amine compound, the diffusibility thereof is kept at such a low level as to prevent the compound from leaking out of the reaction apparatus. Accordingly, even if the amine compound is used in combination with a reaction promoter of low vapor pressure, the absorbent can stably process the acidic gas for a long time. Furthermore, the absorbent has not only high reactivity with acidic gases (such as, carbon dioxide ($CO_2$), hydrogen sulfide ($H_2S$) and carbonyl sulfide (COS)) but also excellent solubility in water.

The acidic gas absorbent containing the compound according to the embodiment is remarkably improved in absorption capacity of acidic gases (particularly, carbon dioxide) per unit mol and in absorption capacity and rate of acidic gases per unit volume of the absorbent. Further, the absorbent of the embodiment also can reduce the amounts of amines emitted from the absorption tower and the regeneration tower.

<Acidic Gas Removal Method>

In the acidic gas removal method according to the embodiment, a gas containing an acidic gas is brought into contact with the above acidic gas absorbent so as to remove the acidic gas from the acidic gas-containing gas.

The acidic gas removal method of the embodiment basically comprises: a step (absorption step) in which the aforementioned absorbent of the embodiment is made to absorb an acidic gas; and another step in which the acidic gas-holding absorbent of the embodiment is made to release the absorbed acidic gas.

Specifically, the acidic gas removal method according to the embodiment essentially comprises: a step (acidic gas absorption step) in which an acidic gas-containing gas (e.g., exhaust gas or the like) is brought into contact with the acidic gas absorbent so that the acidic gas is absorbed in the absorbent; and another step (acidic gas separation step) in which the acidic gas-holding absorbent obtained in the above acidic gas absorption step is heated to desorb and remove the acidic gas from the absorbent.

There are no particular restrictions on how an acidic gas-containing gas is brought into contact with an aqueous solution containing the above acidic gas absorbent. For example, the acidic gas-containing gas may be bubbled and thereby absorbed in the absorbent; the absorbent may be sprayed in the form of mist into a stream of the acidic gas-containing gas (spray method); or otherwise the acidic gas-containing gas may be brought into countercurrent contact with the absorbent in an absorption unit filled with a ceramic or metal mesh filler.

When the aqueous absorbent solution is made to absorb the acidic gas-containing gas, the temperature of the absorbent is preferably room temperature to 60° C. or less, more preferably 50° C. or less, further preferably 20 to 45° C. The lower the treating temperature is, the more the acidic gas is absorbed. However, the lower limit of the treating temperature can be determined according to the gas temperature in the process and to the heat recovery target or the like. The pressure in the step of absorbing the acidic gas is normally near atmospheric pressure. Although the pressure can be increased to enhance the absorption performance, the process is preferably carried out at atmospheric pressure so as to save energy consumption used for compression.

In order to separate the acidic gas from the acidic gas-holding absorbent and to recover pure or highly concentrated carbon dioxide, the absorbent may be heated while the liquid interface thereof is spread in a plate column, in a spray tower or in a regeneration tower filled with a ceramic or metal mesh filler. As a result of that treatment, the acidic gas is desorbed and released from carbamate anions and/or bicarbonate ions.

When the acidic gas is desorbed, the acidic gas absorbent is kept at a temperature of normally 70° C. or more, preferably 80° C. or more, further preferably 90 to 120° C. The higher the temperature is, the more the acidic gas is desorbed. However, in order to raise the temperature, it is necessary to increase energy for heating the absorbent. Accordingly, the temperature can be determined according to the gas temperature in the process and to the heat recovery target or the like. The pressure in the step of desorbing the acidic gas can be normally set at about 1 to 3 atm.

After the acidic gas is desorbed, the acidic gas absorbent can be recycled and reused in the acidic gas absorption step. In addition, heat generated in the step of absorbing the acidic gas is generally cooled in a heat exchanger and used for preheating the aqueous solution supplied to the regeneration unit where the solution is processed for recycling.

The thus recovered acidic gas normally has such a high purity as 95 to 99 vol %. This pure or highly concentrated acidic gas can be utilized as a material for synthesizing chemicals and/or polymers or as a coolant for food freezing. Further, the recovered gas also can be subjected to segregated storage in the ground or the like by use of technologies under development.

Among the above steps, the most energy is consumed in the step where the acidic gas is desorbed from the acidic gas absorbent to regenerate the absorbent. Specifically, this step often consumes about 50 to 80% of the energy used in all the steps. Accordingly, if it is realized to reduce energy consumption in the step of regenerating the absorbent, it becomes possible to lower the cost for absorbing and desorbing the acidic gas and, as a result, the acidic gas can be removed from exhaust fumes efficiently and economically advantageously.

The acidic gas absorbent according to the embodiment can reduce energy necessary for desorbing the acidic gas (namely, for the regeneration step), and therefore the $CO_2$ absorption and desorption steps can be carried out efficiently and economically advantageously.

Further, the amine compound according the embodiment has remarkably high anticorrosive properties for metallic materials such as carbon steel, as compared with alkanol amines, such as 2-aminoethanol, which are conventionally used as acidic gas absorbents. Accordingly, for example, in plant construction, the acidic gas removal method adopting the above absorbent makes it unnecessary to use very costly corrosion-resistant steel of high quality. The method according to the embodiment is thus advantageous in cost.

<Acidic Gas Removal Apparatus>

The acidic gas removal apparatus according to the embodiment comprises:

an absorption unit in which a gas containing an acidic gas is brought into contact with the aforementioned first or second acidic gas absorbent, so that the absorbent absorbs the acidic gas to remove it from the acidic gas-containing gas; and a regeneration unit in which the absorbent holding the acidic gas is made to desorb the acidic gas so as to be regenerated;

so that the absorbent regenerated in the regeneration unit is reused in the absorption unit.

FIG. 1 schematically shows the acidic gas removal apparatus according to the embodiment.

The acidic gas removal apparatus 1 comprises: an absorption unit 2 in which a gas containing an acidic gas (e.g., exhaust gas) is brought into contact with the acidic gas absorbent, so that the absorbent absorbs the acidic gas to remove it from the acidic gas-containing gas; and a regeneration unit 3 in which the absorbent holding the acidic gas is made to desorb the acidic gas so as to be regenerated.

In the following description, the explanation is given in case examples where the acidic gas is carbon dioxide.

As shown in FIG. 1, a discharge gas containing $CO_2$, such as, a combustion exhaust gas emitted from a thermal power plant or the like, is introduced through a gas inlet 4 into the lower part of the absorption unit 2. The discharge gas is confined in the absorption unit 2 and brought into contact with an acidic gas absorbent supplied from an absorbent inlet 5 provided on the upper part of the unit. As the acidic gas absorbent, the aforementioned absorbent of the embodiment is employed.

The acidic gas absorbent may contain not only the aforementioned amine compound and the solvent such as water, but also other compounds, such as, nitrogen-containing compounds that improve $CO_2$ absorption performance, antioxidants and pH adjusters, in desirable amounts.

In the way described above, as the result of contact with the acidic gas absorbent, carbon dioxide is absorbed in the absorbent and thereby removed from the discharge gas. After treated to remove carbon dioxide, the discharge gas is emitted through a gas outlet 6 from the absorption unit 2.

The $CO_2$-holding absorbent is then sent by a rich liquid pump 8 to a heat exchanger 7 and then to the regeneration unit 3. In the regeneration unit 3, while the absorbent is moved down from the upper part to the lower part, the acidic gas is desorbed from the absorbent and thereby the absorbent is regenerated.

The absorbent regenerated in the regeneration unit 3 is sent by a lean liquid pump 9 to the heat exchanger 7 and an absorbent cooler 10, and then returned into the absorption unit 2 through the absorbent inlet 5.

On the other hand, at the upper part of the regeneration unit 3, the acidic gas released from the absorbent is brought into contact with reflux water supplied from a reflux drum 11. The water is then transferred out of the regeneration unit 3.

The $CO_2$-containing reflux water is cooled with a reflux condenser 12, and thereafter separated in the reflux drum 11 into water and a liquid component condensed from water vapor accompanying $CO_2$. The liquid component is sent through an acidic gas recovering line 13 for the step of recovering the acidic gas. Meanwhile, the reflux water separated from the acidic gas is sent into the regeneration unit 3.

The acidic gas removal apparatus 1 thus employs the acidic gas absorbent excellent in acidic gas absorption and desorption performance, and thereby makes it possible to absorb and remove acidic gases efficiently.

EXAMPLES

Example 1

In water, 1-(2-methylsulfonyl-ethyl)piperazine was dissolved so that the concentration thereof might be 50 wt % (2.60 mol/L), to prepare an aqueous solution (which is hereinafter referred to as "absorbent"). The absorbent was placed in a test tube, heated at 40° C., and bubbled at a flow rate of 400 mL/minute with a gas mixture containing 10 vol % of carbon dioxide ($CO_2$) and 90 vol % of nitrogen ($N_2$). At the mouth of the test tube, the $CO_2$ concentration was then measured to evaluate the absorption performance by means of an infrared gas analyzer.

Example 2

In water, 1-(2-methylsulfonyl-ethyl)piperazine and ethyldiethanolamine represented by the formulas (R-01), respectively were dissolved so that the concentrations thereof might be 30 wt % (1.56 mol/L) and 20 wt % (1.67 mol/L), respectively, to prepare an absorbent.

Comparative Example 1

In water, ethyldiethanolamine, which is represented by the formula (R-01), was dissolved so that the concentration thereof might be 65 wt % (4.91 mol/L), to prepare an absorbent.

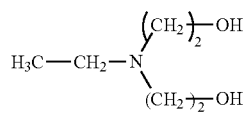
(R-01)

<Results of Evaluation>

Figure 2:
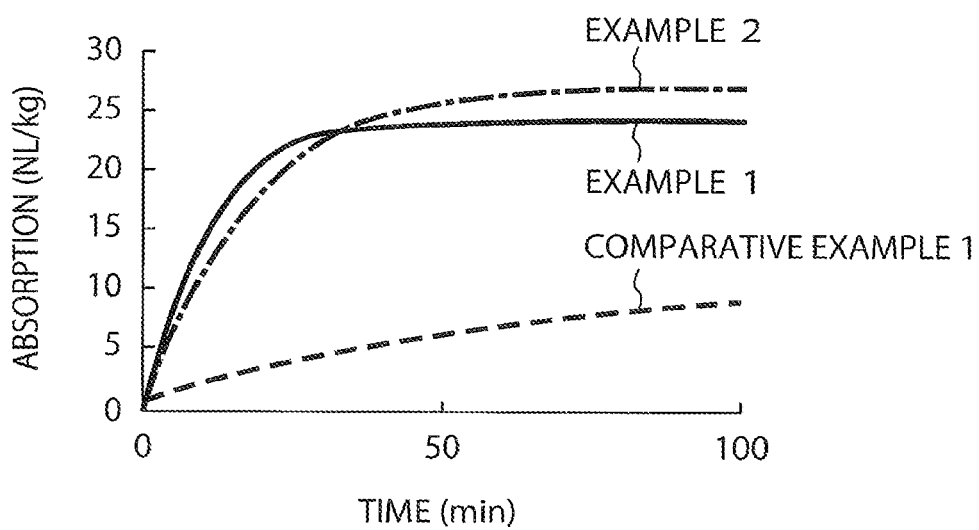
FIG. 2 shows graphs indicating absorption performances of Examples 1, 2 and Comparative example 1.

FIG. 2 shows the results of Examples 1, 2 and Comparative example 1. The absorbent of Example 1 exhibited a high absorption rate immediately after the start of absorption. It was also found from the result of Example 2 that the absorption rate can be controlled by the amount of the amine compound (R-01) used in combination. As for the diffusibility, the absorbents of Examples 1 and 2, which comprise a sulfonyl-containing amine compound, were lower than that of Comparative example.

It can be thus realized at the same time to absorb acidic gases such as carbon dioxide in large amounts and to reduce diffusion of the amine compounds by use of at least one of the embodiments, namely, the acidic gas absorbent, the acidic gas removal method and the acidic gas removal apparatus.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and sprit of the invention.

The invention claimed is:

1. An acidic gas absorbent comprising:
an aliphatic amine compound having a sulfonyl group and two or more amino groups, and
a solvent,
wherein the acidic gas absorbent comprises the aliphatic amine compound in an amount of 10 to 60 wt %.

2. The acidic gas absorbent according to claim 1 wherein said aliphatic amine compound is represented by one of the following formulas:

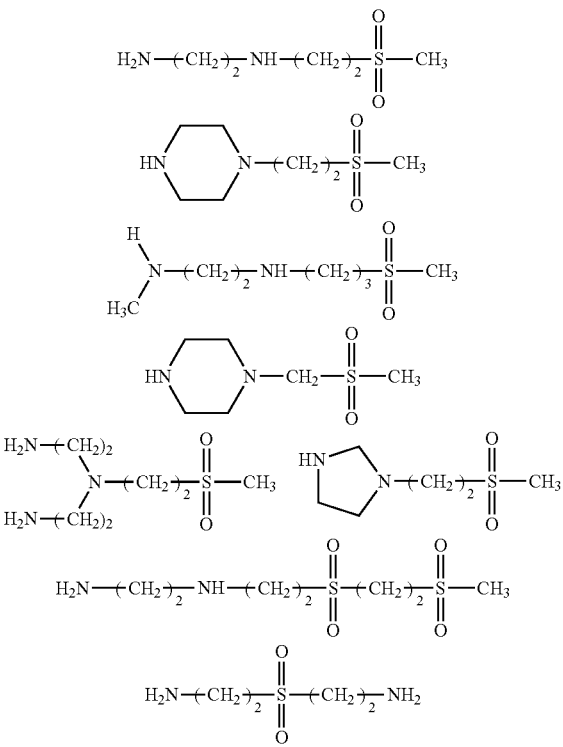

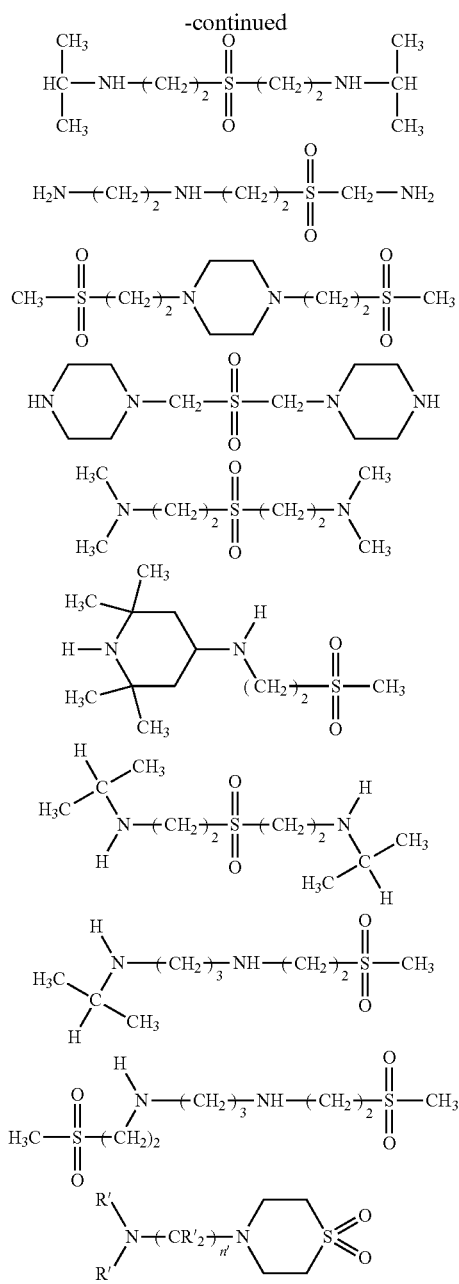

in which
each R' is independently hydrogen, an unsubstituted alkyl group, sulfonyl, carbonyl, amino, carbonyl or a hydroxy-substituted alkyl group; and
n' is an integer of 2 to 4.

3. The acidic gas absorbent according to claim 1, further comprising an aminoalcohol or a piperazine derative.

4. The acidic gas absorbent according to claim 1, further comprising at least one additive agent selected from the group consisting of oxidation inhibitors, pH adjusters, defoaming agents, and anticorrosive agents.

5. The acidic gas absorbent according to claim 1, wherein the solvent is water.

6. The acidic gas absorbent according to claim 1, wherein an amount of the solvent is 20 to 60 wt %, based on a total amount of 100 wt % of the acidic gas absorbent.

7. The acidic gas absorbent according to claim 1, wherein said aliphatic amine compound is represented by the following formula (1a) or (1b):

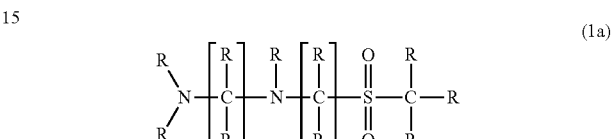

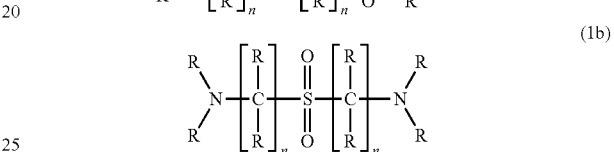

in which
each R is independently hydrogen, an usubstituted alkyl group, sulfonyl, carbonyl, amino, carbonyl or a hydroxy-substituted alkyl group
provided that two of Rs may be linked to form a cyclic structure; and
each n is independently an integer of 1 to 4.

8. The acidic gas absorbent according to claim 7, wherein said unsubstituted or hydroxy-substituted alkyl group contains 1 to 4 carbon atoms.

9. The acidic gas absorbent according to claim 7, wherein said integer represented by n is 1 to 3.

10. An acidic gas removal method in which
a gas containing an acidic gas is brought into contact with the acidic gas absorbent according to claim 1 so as to remove the acidic gas from the acidic gas-containing gas.

11. An acidic gas removal apparatus comprising:
an absorption unit in which a gas containing an acidic gas is brought into contact with the acidic gas absorbent according to claim 1, so that the absorbent absorbs the acidic gas to remove it from the acidic gas-containing gas; and
a regeneration unit in which the absorbent holding the acidic gas is made to desorb the acidic gas so as to be regenerated;
so that the absorbent regenerated in the regeneration unit is reused in the absorption unit.

* * * * *